(12) United States Patent
Micali et al.

(10) Patent No.: US 8,327,149 B2
(45) Date of Patent: *Dec. 4, 2012

(54) EFFICIENT AND SECURE DATA CURRENTNESS SYSTEMS

(75) Inventors: Silvio Micali, Brookline, MA (US); Phil Libin, Cambridge, MA (US); Brandon Volbright, Cambridge, MA (US)

(73) Assignee: CoreStreet, Ltd., Cambridge, MA (US)

( * ) Notice: Subject to any disclaimer, the term of this patent is extended or adjusted under 35 U.S.C. 154(b) by 79 days.

This patent is subject to a terminal disclaimer.

(21) Appl. No.: 12/657,791

(22) Filed: Jan. 27, 2010

(65) Prior Publication Data

US 2010/0268956 A1 Oct. 21, 2010

Related U.S. Application Data

(63) Continuation of application No. 10/845,579, filed on May 13, 2004, now Pat. No. 7,657,751.

(60) Provisional application No. 60/470,093, filed on May 13, 2003.

(51) Int. Cl.
*H04L 9/32* (2006.01)
(52) U.S. Cl. .................................. 713/176; 709/217
(58) Field of Classification Search .................. 713/176
See application file for complete search history.

(56) References Cited

U.S. PATENT DOCUMENTS

| 4,914,571 | A | * | 4/1990 | Baratz et al. ........................ 1/1 |
| 5,850,442 | A | * | 12/1998 | Muftic ............................ 705/65 |
| 6,237,096 | B1 | | 5/2001 | Bisbee et al. |
| 6,430,455 | B1 | * | 8/2002 | Rebello et al. ................ 700/105 |
| 6,430,688 | B1 | * | 8/2002 | Kohl et al. .................... 713/156 |
| 7,136,903 | B1 | * | 11/2006 | Phillips et al. ................ 709/217 |
| 7,216,083 | B2 | * | 5/2007 | Parmelee et al. ............... 705/64 |
| 7,617,154 | B1 | * | 11/2009 | Melling et al. ................. 705/40 |

FOREIGN PATENT DOCUMENTS

| WO | WO01-03363 A | 1/2001 |
| WO | WO03-034308 A | 4/2003 |

* cited by examiner

*Primary Examiner* — William Powers
*Assistant Examiner* — Dant Shaifer Harriman
(74) *Attorney, Agent, or Firm* — Muirhead and Saturnelli, LLC

(57) ABSTRACT

Indicating data currentness includes, on any date of a sequence of dates, issuing a proof indicating the currentness status of the data during a particular time interval. The proof may be a digital signature. The time interval may be in the form of a current date and an amount of time. The proof may include a digital signature of the time interval. The proof may include a digital signature of the time interval and the data. The proof may include a digital signature of the time interval and a compact form of the data, such as a hash. Indicating data currentness may also include distributing the proofs to a plurality of unsecure units that respond to requests by users for the proofs. Indicating data currentness may also include gathering a plurality of separate pieces of data and providing a single proof for the separate pieces of data. The data may be electronic documents.

19 Claims, 1 Drawing Sheet

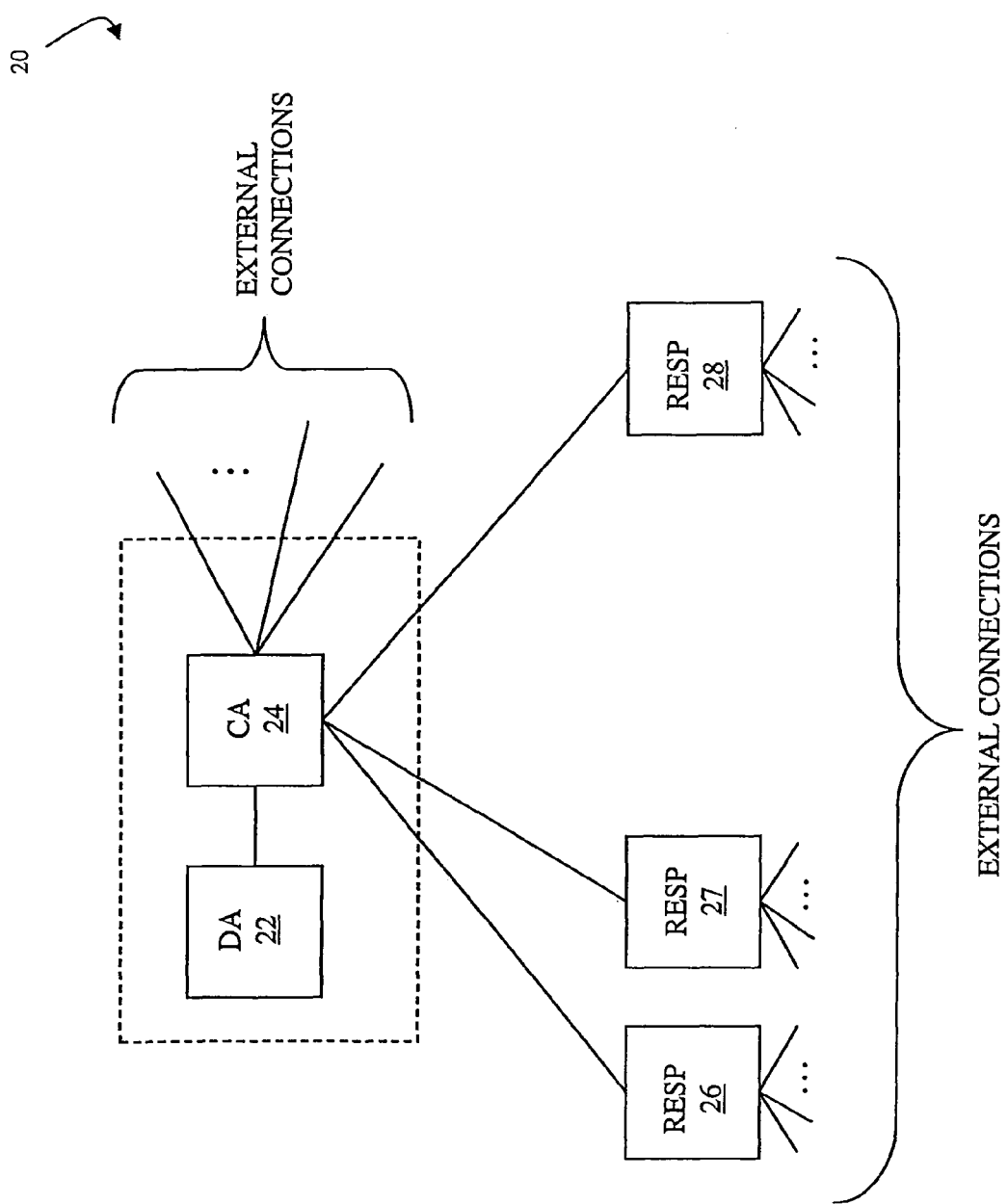

EFFICIENT AND SECURE DATA CURRENTNESS SYSTEMS

RELATED APPLICATIONS

This application is a continuation of U.S. application Ser. No. 10/845,579 filed May 13, 2004, now U.S. Pat. No. 7,657,751, issued Feb. 2, 2010, which is hereby incorporated by reference and which claims priority to U.S. provisional patent application no. 60/470,093 filed on May 13, 2003, which is incorporated by reference herein.

FIELD OF THE INVENTION

The invention relates to the field of data currentness systems and more particularly to providing an automatic and secure indication that data, such as an electronic document, is up-to-date (also referred to as current/current/most recent/valid) in a computing environment with only intermittent network connectivity.

BACKGROUND OF THE INVENTION

It is desirable to be able to determine that a version of data, such as a document, is the most recent. For example, consider an electronic document D, which may be obtained via the Internet. If D were digitally signed (e.g., by a recognized authority), a user may be sure of its authenticity. However, even if the document is digitally signed, the user can not be sure of whether somewhere else in the Internet a more recent/more recently modified version of the document exists. This is a fundamental problem, in particular for the Internet, where documents may be easy to find (e.g., via powerful search engines), though there may be no practical way to tell whether any of the documents may have already become "obsolete."

One way to handle this is, assuming the existence of an entity A who knows when D becomes obsolete, is for a party P to ask A about D in order to determine whether D is current. However, if P relies on D's currentness to take some important action (e.g., one carrying considerable financial consequences), then just being told that D is up-to-date may not be enough, because P may wish to ensure that he has indeed talked to A and because P may wish to archive a proof that D was up-to-date when he relied on its being current. Both concerns could be solved by use of digital signatures (such as the RSA).

Recall that digital signatures are data strings produced via a signing key, SK, and verified via a matching verification key, PK. A user U should keep his own SK secret (so that only U can sign on U's behalf). Fortunately, key PK does not "betray" the matching key SK, that is, knowledge of PK does not give an enemy any practical advantage in computing SK. Therefore, a user U should make his own PK as public as possible (so that every one can verify U's signatures). For this reason PK is preferably called the public key.

To use digital signatures to prove the currentness of a document D, A may, in response to a query of P, compute a digital signature S indicating that D was current at time T: in symbols, $S=SIG_A(D, \text{"current"}, T)$. Of course, rather than the word "current" another indication can be used, including no indication (for instance if the digital signature is only used to indicate that D is indeed current).

If party P verifies that S is correct and that T is in accordance to his own clock, it may safely rely on the currentness of D. Notice that such a proof of D's currentness may be archived by P for future use, and can be verified by any third party, in particular one charged with verifying that P indeed relied on a current version of D. In fact to verify A's signature, one only needs to know A's public key which may be widely publicized. Though very simple, this approach is rather impractical for a number of reasons.

In the first place, P needs to access A at the very time in which it needs to rely on D. Connection at the time of transaction, however, is a demanding requirement. Secondly, digital signatures are time consuming to generate. Even at 50 milliseconds per signature, A could not service more than 200 currentness requests per second, while it be in charge of millions of documents that may be relied upon by millions of users who may generate way more requests per second.

Another drawback is that, if A uses a single server to answer all document currentness queries, then all such queries would have, eventually, to be routed to this unique server, which then may become a major "network bottleneck" and cause considerable congestion and delays. If huge numbers of relying parties suddenly queried this server, then a disrupting "denial of service" would probably ensue. To prevent the bottleneck problems of centralized implementations, A may consider distributing the request load (about the currentness of its documents) across several, properly certified, responders. In general, distributing the load of a single server across several (e.g., 100) servers, strategically located around the world, alleviates network congestion. (Note that if these servers were not geographically dispersed, no significant advantage would be gained: millions of requests sent to the same address co-locating 100 responders would still result in huge congestions).

In the present case, however, load distribution may introduce worse problems than those it solves. In fact, in order to provide digitally signed responses to the document-currentness queries it receives, each of the one hundred responders should have its own secret signing key. Thus, compromising any of the one hundred servers could effectively compromise the entire currentness system. Indeed, if a responder were compromised, an attacker could use the discovered secret signing key to sign responses indicating that (1) current document are revoked, or (2) obsolete documents are still current.

A secure way to prevent a responder from being compromised is to run it from a secure vault, with 24×7 surveillance. Unfortunately, this is a costly option. A truly secure vault, meeting all the requirements of—say—a financial organization, may cost over $1M to build and $1M/year to operate. Even if an organization were willing to pick up such expenses, vaults cannot be built overnight: armored concrete does not scale. Thus if A needed a few more vaults to lessen the load of its responders, it might have to wait for months before a new one could be constructed.

Moreover, incurring the costs of multiple vaults may not solve the security problems of the envisaged mechanism. This is because this mechanism requires that a responder receive requests coming from un-trusted sources (the relying parties) and then service them using its secret signing key. A malicious relying party (or a malicious agent posing as a relying party) might thus prefer exposing the responder's signing key by exploiting a possible weakness in the underlying operating system, rather than by drilling holes during the night through an armored-concrete wall. In sum, even if a truly secure building housed a responder, its secret key could still be compromised by a software attack. To a sophisticated, digital enemy, the envisaged mechanism transforms a vault into "a bunker with a window."

Another drawback is that the envisaged mechanism has difficulties in servicing document currentness queries across multiple organizations. For instance, responders run by organization #1 can easily provide responses about the status of documents relating to organization #1, but responders run by another organization may not have enough information to provide responses about "foreign" documents.

SUMMARY OF THE INVENTION

The present invention proposes a method of conveying information about currentness and validity of documents. On any date in a sequence of dates, an authority A for each document in a plurality of documents, issues a proof indicating the currentness status of the document as of that date. Such a proof may be a digital signature on information that identifies the document, such as the document itself or its hash or its serial number, its current validity status, the time, such as the date and/or time interval, for which for which the validity status applies, and any other auxiliary information. These proof are then provided to one or more responders that are capable of answering inquiries. The responders may be unsecured. Each responder stores the proofs received. In response to a user's inquiry about a particular document, a directory provides the latest received information about the status of the document.

According to the present invention, conveying currentness information about a document that is one of a plurality of documents includes, at every date j of a sequence of dates, and for every document i of the plurality of documents, having a currentness authority compute individual currentness status information Ci about i by digitally signing information identifying i, date j and an indication whether i continues to be valid, or is obsolete, or is suspended, providing the digitally signed currentness status information Ci to a responder, for each document i in a plurality of documents, having the responder store the latest received Ci, and, in response to an inquiry about currentness status of document i, having the responder provide the latest received Ci. Digitally signing may include digitally signing with respect to a public verification key pk, which is digitally signed by the document authority with respect to another public verification key PK. The public verification key pk, may be contained as part of the document i. The currentness status information Ci of an obsolete document i may include a signature indicating that i has been revoked together with i's revocation date. The currentness status information Ci of an obsolete document i may include a signature indicating a more current version of the document. The responder may not trusted and may not make an obsolete or suspend document current and may not make a current document obsolete or suspended. The information identifying i may be i itself. The information identifying i may be a compact representation of i. The compact representation may be computed via a hash function. The information identifying i may be a serial number. The currentness authority may receive updates of document currentness from the document authority and may use them in order to compute the currentness status of documents. The currentness authority may compute the status of each document as valid until the updates inform otherwise. The currentness authority may compute the status of each document as valid until a prespecified date and time. Each date in the sequence of dates may be determined by the document authority. The document i may contain information on the currentness authority responsible for updating the currentness status. The currentness authority may produce the public key pk and makes it available to the document authority, while retaining the corresponding secret key sk. The currentness authority may be the same entity as document authority.

According further to the present invention, conveying currentness information about a document that is one of a plurality of documents includes, at every date j of a sequence of dates, and for every document i of the plurality of documents, computing individual currentness status information Ci about i by digitally signing information identifying i, date j and an indication whether i continues to be valid, or is obsolete, or is suspended, for each document i in a plurality of documents, storing the latest Ci, and, in response to an inquiry about currentness status of document i, providing the latest received Ci.

According further to the present invention, verifying whether a particular document that is one of a plurality of documents is currently valid at a current date, includes receiving particular currentness status information about the particular document, where currentness status information Ci, for every document i is determined by having a currentness authority compute individual Ci about document i by digitally signing information identifying i, date j for every date j of a sequence of dates, and an indication whether i continues to be valid, or is obsolete, or is suspended and confirming that the particular currentness status information was digitally signed by the currentness authority and that the particular currentness status information indicates that the particular document continues to be valid at the current date.

According further to the present invention, indicating data currentness includes determining a time interval for which the data is current and providing a proof that the data is current for the time interval. The proof may be a digital signature. The time interval may be in the form of a current date and an amount of time. The proof may include a digital signature of the time interval. The proof may include a digital signature of the time interval and the data. The proof may include a digital signature of the time interval and a compact form of the data, such as a hash. Indicating data currentness may also include distributing the proofs to a plurality of unsecure units that respond to requests by users for the proofs. Indicating data currentness may also include gathering a plurality of separate pieces of data and providing a single proof for the separate pieces of data. The data may be electronic documents.

According further to the present invention, verifying data currentness includes examining for validity a proof provided in connection with the data, wherein the proof includes a time interval for which the data is current, comparing the current time with the time interval, and, if the current time is within the time interval, determining that the data is current. The proof may be a digital signature. The time interval may be in the form of a current date and an amount of time. The proof may include a digital signature of the time interval. The proof may include a digital signature of the time interval and the data. The proof may include a digital signature of the time interval and a compact form of the data, such as a hash. Verifying data currentness may also include obtaining the proof from one of a plurality of unsecure units that respond to requests by users for the proofs. The data may be electronic documents.

The present invention addresses the drawbacks of the impractical approach discussed above in the Background section. In particular, the invention offers the following advantages:

1. It can centralize all management trust into a single authority/server; yet,

2. It can distribute the query load from this single authority across an arbitrary number of unprotected responders;

3. It does not decrease security even in distributed implementations relying on thousands of responders (and even though these responders are unprotected.);

4. It improves dramatically the response time to a query;

5. It does not delegate trust to foreign Responders in the most heterogeneous environments.

BRIEF DESCRIPTION OF THE DRAWING

The sole FIGURE is a schematic diagrammatic illustrating a document authority (DA), a currentness authority (CA), and a plurality of data currentness system (DCS) responders according to the system described herein.

DESCRIPTION OF THE PREFERRED EMBODIMENTS

Described is a data currentness system (DCS) that enables an organization to issue (i.e., produce) and manage (i.e., prove current or obsolete) millions of pieces of data with great ease and convenience. The system is described illustrating an embodiment where the data corresponds to documents, although it will be appreciated by one of ordinary skill in the art that the techniques and embodiments described herein as being applied to documents may be extended to any type of data, such as data for a database.

This application incorporates by reference U.S. Pat. Nos. 5,666,416; 5,793,868; 6,097,811; 6,301,659 B1; 5,717,758; 5,717,757; and US published application 20040049675. Those patents and applications are directed at efficiently and securely prove certificates valid or revoked (as well as suspended or unknown).

Note that Certificates are alphanumeric strings that enable digital signatures, by guaranteeing that a given key PK is indeed the public key of a user U. A certification authority X generates and issues a certificate to a user, once assured of the user's identity. Thus the certificate proves to everyone that X has verified the holder's identity, and possibly other attributes. Certificates expire after a specified amount of time, typically one year in the case of public CAs. In essence, a digital certificate C consists of X's digital signature securely binding together several quantities: SN, a serial number unique to the certificate, PK, the public key of the user, U, the user's name, $D_1$, the issue date, $D_2$, the expiration date, and additional data. In symbols, $C=SIG_x(SN,PK,U,D_1,D_2,\ldots)$.

The techniques in the aforementioned U.S. Pat. Nos. 5,666, 416; 5,793,868; 6,097,811; 6,301,659 B1; 5,717,758; 5,717, 757; and US published application 20040049675 apply to the system described herein by explicitly reading "certificate" as "document", "valid" as "current", "revoked" as "obsolete", and the entity that proves certificates valid or revoked as a currentness authority. Without limitation intended, some of these "translations" are presented below.

Referring to the sole FIGURE, a diagram 20 shows a document authority (DA) 22 that controls issuing functions coupled to a currentness authority (CA) 24 that controls management functions. It may be advantageous to assume that the DA 22 and the CA 24 are two distinct entities. However, the DA 22 and the CA 24 may coincide or being hosted within the same server, processor, or computing device. In the later case, the distinct names of the entities may be just a convenient way to distinguish between the two different functions. A dotted line box around the DA 22 and CA 24 illustrate that the functionality described herein for the DA 22 and the CA 24 may be implemented in a single unit or an integrated set of units.

The DA 22 may issue its documents in an authenticated way. In particular, the DA 22 may possess matching public and secret keys of a signature scheme and sign the documents it issues, so as to enable anyone to verify (via the DA's public key) that a document has been issued by the DA 22. Before signing the data string proper, the DA 22 may include additional fields (e.g., a serial number unique to the document, time information such as the issuance date, the issuer's name, the algorithm used to digitally sign, the type of one-way hash function used). A particularly useful field to have in a document D is an expiration date ED, signifying that D should in any case not be considered current past ED. If needed, one may re-issue the document from scratch to "further elongate" its life time. Reference to document D may be considered a reference to the data string before it is signed by the DA 22 or to the DA-signed data string, possibly together with additional fields (all additional fields).

The DA 22 provides the authenticated documents to the CA 24, which may distribute the authenticated documents to users via external connections (e.g., via the Internet). Alternatively, the CA 24 may distribute the authenticated documents to one or more of a plurality of DCS responders 26-28, where the DCS responders 26-28 distribute the authenticated documents to users via external connections (e.g., via the Internet). The CA 24 may be coupled to the DCS responders 26-28 using any appropriate technique, including the Internet. In addition, any one of the DCS responders 26-28 may be coupled to the CA 24 in a way that is different from how any other one of the DCS responders 26-28 is coupled to the CA 24 so that, for example, the DCS responder 26 may be coupled to the CA 24 via the Internet while the DCS responder 27 may be hard wired directly to the CA 24.

The DCS described herein achieves improvements over the impractical approach described in the Background section by the following:

The CA 24 May Be Certified

In an embodiment herein, an organization provides its own CA with a special certificate, the CA certificate. This certificate may be produces by the organization, by a certification authority of the organization, by the DA, etc. The goal of this certificate is conveying CA status to a given entity (e.g., identified by a given identifier, OID number, etc.) by indicating that what it says about currentness of its document may be relied upon and by facilitating the verification of what it says about currentness. Indeed, the CA certificate may bind a given verification key PK (for which the given entity possesses a corresponding secret signing key) to the given entity, so that when the certified entity digitally signs currentness information, others know which verification key PK should be used to verify the CA's signature.

In an embodiment herein, each organization has only one CA, though it may be advantageous to have more than one (e.g., for redundancy purposes). In case of multiple CAs, these may use different verification/signing keys or the same key.

The CA 24 protects its signing key.

The CA must protect its signing key, for instance by means of a vault, secure facility, or secure hardware. However, as set forth in more detail elsewhere herein, the DCS system does not need any additional vaults for document currentness purposes. The CA may host in the same protected facility more than one server embedding its secret signing key, or securely store copies of the key—e.g., in Banks' safe security boxes—or host more than one server each having a secret signing key properly certified by the organization.

The CA 24 individually signs the current status of each document for a given interval of time, independent of any relying-party request.

At any date Di of a sequence of dates, D1, D2, . . . , the CA, independent of any relying-party request, performs a currentness update. In such an update, for each individual document D that should still be considered current, the CA produces a digitally signed declaration stating that D is deemed current for a time interval T: e.g., in symbols, $$SIG_{CA}(D, \text{current}, T, AI)$$

where AI, here and in the sequel, refers to any "additional information" that may be deemed proper, including no information. In an embodiment herein, at each update, the "currentness interval T" is the same for all (deemed current) documents. Also in an embodiment herein, the time interval T is correlated with the sequence of dates: for instance, T may coincide with "from date Di (e.g., included) to Di+1 (e.g., excluded)." Also in an embodiment herein, the sequence of dates Di is predictable (e.g., the sequences of dates coincides with the sequence of days, starting with a fixed day—e.g., Jan. 1, 2000—and, without limitation intended, using Eastern Standard Time). In such a case the update date Di itself is a good description of T="from Di to Di+1." This allows for fast and automatic and standardized processing at each update. However, having different time intervals for different documents may be very useful and yield more efficient processing. For instance, a sensitive document D may have its currentness re-established every day, and thus, assuming that the sequence of update dates coincides with the sequence of days, the signature $$SIG_{CA}(D, \text{current}, (Di,Di+1), AI)$$

may be produced at each day Di, while a less sensitive document D' may be deemed current for a week, and thus $SIG_{CA}$ (D, current, (Di,Di+7), AI) may be produced every seventh day Di.

When a document D becomes obsolete, the CA 24 may also issue a digital signature indicating that D is obsolete. Such a signature may indicate the precise time t in which D was declared obsolete, and yet be included in the next update. Alternatively, the CA may produce a signature stating that D has been made obsolete at the first update date Di after t. For instance, this signature may look like $$SIG_{CA}(D, \text{obsolete}, (Di,Di+1), AI) \text{ or}$$

$$SIG_{CA}(D, \text{obsolete}, Di, AI) \text{ or}$$

$$SIG_{CA}(D, \text{obsolete}, t, AI) \text{ or}$$

$$SIG_{CA}(D, \text{obsolete}, AI)$$

If obsolete documents may never become current again, then the CA 24 may skip to sign again that D is obsolete at future updates, or to include an older signature of obsoleteness in the present update, because the older signature may be considered as recently produced. It is also possible for the CA 24 to sign other status information about a document at interval T, such as "suspended" or "unknown".

In essence, therefore, the CA 24 pre-computes a digital signature indicating the status of each non-expired document for a given time interval T. Such pre-computation is performed independent of any relying party request about the documents' currentness. Indeed, in some cases it may be desirable that the CA 24 pre-computes a signed declaration of the currentness status of a document D for a given time interval before any status query about D is ever made in that interval—indeed, even before that time interval starts.

The CA 24 sends his pre-computed signatures of currentness status to unprotected responders.

After pre-computing such a signature, the CA 24 makes it available (e.g., sends it) to other parties. In particular, it may return it to relying parties in response to a currentness status query. In an embodiment described herein, however, the CA 24 makes its signed declarations available to DCS responders, which may then return it to a relying party in response to a question about the currentness of D. These responders need not be protected. In fact they do not digitally sign any response, and thus they do not need to store and protect any secret signing key. They are secret-less and thus need no special protection: they just store and forward CA-signed messages, and these cannot in practice be fraudulently modified or altered in any non-detectable way. Indeed, the CA 24 may easily send its signed declarations also to foreign responders (responders belonging to other organizations) without jeopardizing security.

The CA 24 may facilitate the responders' processing of its signatures by presenting them to DCS responders 26-28 in a suitably organized fashion. For instance, it may present its signed declarations of document currentness status ordered according to document serial number, or ensuring that each signed piece of data has the same or suitably closed length, etc. To ensure that all the relevant pre-computed responses have been received, at every update the CA 24 may provide DCS responders 26-28 with an additional signature, by signing and dating the totality of its declarations/artificial, pre-computed responses.

In addition, the CA 24 may send to the DCS responders 26-28 its own CA certificate (if any). This transmission needs not occur at every update. In particular, it may be performed only initially.

The responders store the CA-pre-computed responses.

A responder stores the received pre-computed responses of the CA for a sufficient time. In an embodiment described herein, if these signatures relate to a given time interval T, they store them at least until the end of T. In an embodiment described herein, the responders (especially those belonging to the same organization as the CA) may check to have correct information. For instance, a DCS responder may Verify that the pre-computed responses about a time interval T are received by the beginning of T (or other suitable time related to T);

Verify all received CA signatures (and possibly also the proper CA certificate);

Verify whether it has received all signatures (e.g., no less than the number of outstanding documents, etc.);

Verify whether it has received a CA-signed declaration of currentness for a document that was previously declared obsolete; etc.

If any problem is detected, it may so inform the CA or another proper entity.

Relying Parties Ask Responders for Currentness Status Information

Relying parties ask responders for the current status of documents.

DCS Responders Answer Queries with CA-Pre-Computed Responses

When asked about the currentness of a given document, the responder fetches from memory the pre-computed answer of the CA for that document and returns it.

A DCS responder may also forward the proper certificate for the CA that has signed the pre-computed response. The relying party may signal that it is not interested in such a CA certificate, or the responder may know or assume that the relying party has already a copy of it.

Relying the CA's pre-computed answers (and CA certificates).

Relying parties process the received responses to ascertain the currentness status of the document of interest. In an embodiment herein, they verify the proper CA certificates as well (if any).

Note that the CA may be the original decision maker, who determines which documents should be deemed valid, or the "executor" of someone else's decisions. For instance, it is informed by the organization or by the DA about the documents' currentness information (e.g., by means of a single signed message prior to an update) and may utilize that information when processing an update. In particular, the DA may provide instructions to the CA as to the default validity status of every document (e.g., "valid for three months from date of issuance"), and the CA may adhere to these instruction until and unless instructed otherwise by the DA. A human controlling the DA may have a console enabling him to easily see the validity status of every document issued by the DA and to revoke and revise documents.

The so described general DCS enjoys significant advantages over the above described impractical approach described above in the Background section. In the first place, digital signatures are computationally intensive operations. However, the DCS may concentrate this difficulty on a single CA server. It is therefore very easy and relatively inexpensive to equip a CA with a computer sufficiently powerful to handle all required digital signatures at each update. By contrast, the DCS responders only perform trivial fetch-and-forward operations, and thus service an incoming relying-party query much faster than even expensive responders of the impractical approach could, since the latter must perform complex digital signatures.

In addition, because DCS responders may employ trivial hardware and do not need to be secure, they may be incredibly cheap to buy and to operate. Consequently, DCS responders may be deployed in great numbers without any problems: one may always afford distributed implementations of DCS systems. Therefore, even if enormously many document-currentness requests are generated in a short amount of time, this load may always be spread across many DCS responders, eliminating the risk of congestion and benign denial of service without incurring much cost. Note that the amount of work of the CA solely depends on the number of documents and is not affected by the number of currentness-status requests. Thus a single CA server may be used even if millions and millions of currentness requested are expected.

In addition, for the DCS described herein, only the CA (besides the DA, if it is a different/differently located entity) needs to be protected. In fact, DCS responders do not store any secret keys: they only store the digital signatures of the CA—which, once computed, cannot be maliciously altered and thus need not be kept secret. By contrast, for the impractical approach discussed in the Background section, all responders need protections, because each one of them has a secret signing key whose compromise the entire system. Therefore, DCS is more secure than the above described impractical approach, because defending a single site is arguably easier and less difficult and/or expensive than defending many and equally important sites.

Moreover, unlike in the impractical approach described above, relying parties cannot easily mount software attacks in a DCS environment. Even if a relying party succeeded in embedding in its query some kind of Trojan horse, it would not be able to expose any secrets, because DCS responders hold no secrets for the system: they only store and return pre-computed digital signatures of the CA. Thus, all a malicious relying party may hope to expose is the full, accurate, and digitally signed account of which documents are current and which are obsolete in a given time interval. But this not only is non-secret information, it is even information that the CA would like to be universally known, so that no one may rely incorrectly on the currentness of the documents.

In addition, note that software attacks may not be easily mounted against the CA either. In fact, though possessing a secret signing key, the CA does not process requests of untrusted sources. This is so because the CA only outputs data (its own digitally signed declarations) but does not receive any untrusted inputs. Even when informed about which documents should be deemed current by its organization or DA, the latter two entities are far from being untrusted sources. Therefore the very ability to inject a Trojan horse is not available in the DCS. In other words, only a single vault (the one protecting the CA) is sufficient in the DCS, and this vault has no "windows" whatsoever.

In addition to the advantages discussed above, the DCS enables significant flexibility within heterogeneous deployments involving multiple organizations. A DCS responder from organization #2 may forward CA responses from organization #1 to DCS relying parties of organization #2 without needing to transfer any trust from organization #1 to organization #2. Since DCS responders are simple and non-trusted relays of information, they may be widely distributed and mirrored without reducing overall system security.

Assume a relying party queries a responder of organization #2 about the currentness of a document of organization #1. Then the response that it gets back is convincing because it is digitally signed by a CA of organization #1, which is best positioned to know which documents of organization #1 are still current, and which has the greatest interest in not making mistakes. This response may be made even more authoritative by having the relying party also get this CA's certificate (e.g., signed by organization #1), vouching that it is indeed a proper CA of organization #1.

In sum, organization #1 enables the DCS responders of organization #2 to provide convincing proofs of currentness for organization #1's documents without relinquishing any amount of control over the currentness status of its own documents. That is, in the DCS trust may flow from one organization to another without any loss of security or control.

Furthermore, in an extreme case, DCS responders may be treated as transparent network infrastructure rather than hardened trust points. This is similar to the service cloud offered by the Internet's DNS infrastructure, in that it allows for a heterogeneous collection of servers that transparently interoperate to discover and cache CA-signed currentness responses for queries. Secure heterogeneity is a major advantage of DCS over the impractical approach discussed in the Background section. It allows a wide variety of organizations to interoperate at a document level in a secure, reliable, efficient manner.

The DCS may be used to facilitate transactions. Let U be a party sending a document D as part of a transaction with a party V. For the overall transaction to be secure, V should ascertain the currentness of D and make a currentness query about D to a DCS responder. The responder would answer this query by fetching and returning the most current CA-signed declaration about D. However, querying a DCS responder makes 3-party a transaction that would otherwise be 2-party, increasing the time of the desired U-V transaction.

However, thanks to its predictable time intervals, the DCS may be used to address this situation. Namely, party U may, at the beginning of each time interval T (or during it anyway), receive a CA-signed declaration d that D should be deemed current throughout T. U may receive d in response to a request to his (e.g., by making a ordinary relying-party request) or may be pushed d (e.g, by a DCS responder or by a CA at every update on an automatic basis). In either case, transacting with V during interval T, U may forward d to V, in addition to all other steps or tasks the transaction entails. Therefore, the U-V transaction is significantly sped up, since V needs not call any third party in order to ascertain the currentness of D.

Though, in some sense, the "overall time," which includes U obtaining d, may not be sped up, the U-V transaction may be. Notice that speeding up only the U-V transaction without saving in overall time, may still be quite valuable. In fact, assume CA declarations may be computed at midnight and specify an entire day as their time interval. Then, U may obtain d early in the day (when no real pressure exists) and then forward it to V during a time sensitive U-V transaction conducted during working hours, when saving time could be essential. Further efficiency is gained if U, after obtaining and caching d, forwards it throughout the day when transacting with several (e.g., 100) parties. This way, for instance, a single relying-party query (that of U itself, possibly made at a relaxed time) successfully replaces 100 relying-party requests (possibly at times of pressure).

Note that this optimization may also be achieved by the parties V. Namely, after obtaining a response d from a DCS responder in return to a query about the currentness of a document D, party V may give d to U, or make d available for others to use.

Discussed above is a version of the DCS where the time interval T through which a document D should be deemed current is specified within a CA-signed response. However, it is also possible within the DCS that a document D may specify information about its own currentness intervals. In this case, a CA response may specify the interval T using the interval information of D. For instance, if D specifies daily updates, then any time within a given day suffices to specify the entire day to which a response refers. As for another example, if D specifies daily updates, has been issued in 2004, and will expire on Dec. 31, 2004, then a CA-signed response may just specify the number of the day in question (starting with Jan. 1, 2004, as day 1). Alternatively, if it is clear (e.g., from the CA's general policies) that the documents have currentness intervals consisting of a full day, then there is no need for this information to be specified within a document, and yet the same savings in CA responses apply.

It is also possible to use the DCS to provide proof of obsoleteness. While a DCS proof of currentness (or suspension) for a given document D should specify the time interval to which it refers, a proof of obsoleteness needs not specify any time interval: it suffices for it to specify a single point in time (e.g., the actual time when the document is made obsolete). Unlike currentness and suspension, in fact, declaring a document obsolete may constitute an irrevocable process. Thus, a single obsoleteness time may suffice for proving a document obsolete. And this time need not be the beginning of any time interval T (e.g., it could be any time in "the middle" of an interval T). Therefore, the CA need not send D's obsoleteness proof at all update dates (e.g., D1, D2, etc.). In principle, an obsoleteness proof could be sent only once (or a few times for redundancy) and then cached by a DCS responder and then returned whenever a relying-party query about D is made.

Note also that, if it is not the sole decision maker about the currentness of the organization's documents, the CA may be informed right away that a document D has been made obsolete; for instance, in the middle of a time interval T for which the CA has already produced and forwarded a proof of currentness for document. D to the DCS responders. Of course, by the next update, no such proof of currentness will be computed for D. But for the time being (i.e., until the end of T) an incorrect proof of currentness is out there. Thus, a possible counter-measure consists of having proofs of obsoleteness take precedence over proofs of currentness. That is, an honest relying party that sees both a proof of currentness for D for some time interval T and a proof of obsoleteness for D (at whatever time t), should regard D as obsolete (after time t). However, some relying parties may have never seen such a proof of obsoleteness, and thus D may considered by some still current until the end of T. Such problems are somewhat unavoidable, in the sense that even in the impractical approach described in the Background section, the news of the obsoleteness of D may take some time to reach the responders, and it may take even longer to realize that D should be made obsolete. Nonetheless, these problems may be lessened by having the CA compute and send all DCS responders a proof of D's obsoleteness (independent of the scheduled dates D1,D2, . . . ) as soon as it learns that D has been made obsolete (e.g., directly from the DA). All properly functioning DCS responders may then erase from memory any proof of D's currentness and substitute it with the newly received proof of obsoleteness. This way, from that time on, they may provide relying parties with accurate proofs about D's currentness.

There may be different kinds of currentness proof. The current status of a document D may be signed by the CA by identifying D in many ways. For instance, if D is current at time interval T, such a signature may consist of $$SIG_{CA}(D, T, \text{current}, AI)$$

In fact, D in its entirety may always act as an identifier for D. This method may, however, be time consuming if a document D is very long, since it requires the CA to process such a long document at each update. A better way consists of having the CA sign D's currentness status by identifying D in shorter but secure ways. For instance, $$SIG_{CA}(H(D), T, \text{current}, AI) \text{ or } SIG_{CA}(H(D), T, \text{obsolete}, AI)$$

where H is a one-way hash function. In fact, H(D) may be much shorter than D: typically, H(D) may be twenty bytes long. Yet, in practice, H(D) constitutes an excellent identifier for D because it is computationally impossible to find two distinct documents D and D' such that H(D)=H(D'). Thus by declaring H(D) current there is no practical risk that the same signature of CA may accidentally also declare current an obsolete document D'. This method is arguably more practical because the CA may keep around the value H(D) for each non-expired document D, and then at each update it just retrieves H(D) and issues the proper signature. One advantage of using H(D) as an identifier for D is that is reasonably short and yet no special effort or book keeping needs to be made in order to enforce that no two documents share the same identifier: this may in practice happen automatically.

Alternatively, if a document D is securely bound to a unique serial number SN (e.g., if SN is digitally signed together other fields of D upon issuance), then a short and secure way for the CA to declare that D is current at time interval T consists of producing the signature $$SIG_{CA}(SN, T, \text{current}, AI)$$

In general, any good identifier ID of D may be used by the CA to declare D's current status: in symbols, $$SIG_{CA}(ID, T, \text{current}, AI).$$

An alternative method arises when the public key to be used to verify a signed currentness status of a document D is securely bound to D (for instance, by having PK specified within D, as it may be achieved by having D's issuer sign D with PK as a field). In this case, a signed currentness status of D may be symbolically represented, without limitation, as $SIG_{PK}(D, T, \text{current}, AI)$ or $SIG_{PK}(ID, \text{date}, \text{obsolete}, AI)$ where ID represents a suitable identifier for D. If the currentness-status verification key PK securely bound to D is unique to D (e.g., it is not "embedded" in any other document), then PK itself is a suitable identifier for D and all other identifiers may be dropped. Thus a signed currentness status for D may be of the form $SIG_{PK}(T, \text{current}, AI)$ or $SIG_{PK}(T, \text{date}, \text{obsolete}, AI)$ Such a signature may be verified by anyone via the public key PK securely bound to D.

There are at least two possible ways to securely bind document D with key PK. For instance, this binding may be produced by the CA who, in order to manage document D, initially produces a signature such as $SIG_{CA}(ID, PK, AI)$ where ID is a suitable identifier of D. Alternatively, this binding may be produced by the DA upon issuing the original document D. Alternatively yet, this binding may be produced by the DA upon issuing the original document D, but the CA may have the (possibly exclusive) capability of managing D. For instance, prior to D's issuance, the CA may produce a matching public/secret key pair (PK,SK) and send PK to the DA. It may send the DA a batch of such public keys for computational convenience, and the DA chooses one that it securely binds to D. If the batch contains sufficiently many PK keys, then, if desired, the DA may choose one such PK to embed into D and no other document, so that PK will be unique to D. This way, DA still issues D and CA may manage D via SK according to one of the methods described above. Such methods may be very efficient because the signature that binds PK to D may be time consuming, but may be computed only once. By contrast, the signatures relative to PK may in general be computed at every update date Di, but relate only to predictable and restricted types of messages (essentially, the time intervals T) and may thus be much faster than more general types of signatures. These special purpose signature schemes may be made even more efficient by further restricting the messages they need to sign. One may embed into a document D two public keys, PK1 and PK2, one to digitally sign proofs of D's currentness and one to sign proof(s) of D's obsoleteness. Alternatively, though PK1 may sign proofs of currentness and PK2 proofs of obsoleteness, one may consider the pair PK1-PK2 as a single public key PK. Particularly efficient methods to choose and use PK1 and PK2 is those taught in U.S. Pat. No. 5,666,416. In this case, assuming the sequence of currentness time intervals consisting of the sequence of days in a year, and documents that expire after one year, then PK1 may be the 20-byte quantity $X_{365}$ and PK2 the 20-byte quantity $Y_{365}$ or $Y_1$, obtained by iterating a given one-way function of initial inputs $X_0$ and $Y_0$ respectively.

Another way to prove a document current consists of reissuing the document, rather than proving still current a previously issued document. In this case, it may be desireable to issue a document D (even the first time) with a short life span. This may be accomplished by specifying an expiration date for D close to its issuance date, and thus a life-span interval T. Document D may contain T explicitly, or implicitly (e.g., by specify separately the issuance date and the expiration date), or even "invisibly" (e.g., by specifying the expiration date but not the time when D is actually issued or re-issued). In either case, it is possible to represent the life-span interval with the same symbol T used herein for symbolic representation of a issued or re-issued document: e.g., $SIG_{CA}(D, T, AI)$ or $SIG_{DA}(D, T, AI)$ By the end of T, if D may again be deemed current, D may be re-issued with a "next" time interval specified: in symbols, $SIG_{CA}(D, T', AI)$ or $SIG_{DA}(D, T', AI)$ Note that in this re-issuing approach the CA may indeed coincide with the DA, and even have the same public and secret keys for the issuance and the re-issuance functions, so as to make a re-issued document operationally identical to an issued one. Indeed, if desired, one may have identical format for issued and re-issued documents, including having life-span intervals of the same length. In this case, the only way to tell apart the originally issued version of D from its subsequent reissued version might consist of looking at the "earliest" life-span interval, if they do not overlap. For efficiency purposes, re-issuance signatures may be pre-computed (e.g., in the middle of the previous life-span interval) and kept in storage, and then released at the end of the day only for those documents that are still in force. This way, a DA may re-issue millions of documents very quickly at a time of great pressure.

Unfortunately, keeping issued and re-issued versions of a document D operationally identical limits the possible identifiers for D. For instance, a unique serial number SN securely embedded in D (e.g., specified as a field in D's—symbolically making SN part of D's additional information AI) may act as an excellent identifier for D for its subsequent re-issuances (or currentness proofs for that matter), but makes D's issued and re-issued version, e.g., $SIG_{DA}(D, T, AI)$ and $SIG_{DA}(SN, T', AI)$ quite different. Note that producing the re-issuing signature $SIG_{DA}(SN, T', AI)$ is arguably easier than producing the original issuance signature $SIG_{DA}(D, T, AI)$, because document D may be quite long and may need to be processed in its entirety in order to compute $SIG_{DA}(D, T, AI)$. Note too however, that to verify the re-issued version of D, one needs to ascertain that SN is indeed D's legitimate serial number, and thus needs to verify the original signature $SIG_{DA}(D, T, AI)$ as well (if it specifies SN within AI). Thus, while the original issued document may be verified in a self-contained manner, the re-issued one needs the original issuance signature to be verified. To avoid this inconvenience and treat equally the issued and any reissued version of D, one may use D as an identifier for D: e.g., $SIG_{DA}(D, T, AI)$ and $SIG_{DA}(D, T', AI)$ but by so doing one makes re-issuance very time-consuming, because all of D needs to be processed from scratch. This may generate prohibitive costs for an organization that has very many and very long documents. To avoid this problem while keeping self-contained verification or re-issued documents, it is possible to securely de-couple the processing necessary for computing an issuing or re-issuing signature into (at least) two separate parts: one or more static part(s) containing the data-string-proper component of a document that does not change at each re-issuance time, and thus amenable to be computed only once, and one or more dynamic part(s) containing data that may change at every re-issuance time, and should thus be computed from scratch. Secure de-coupling may be understood to mean a de-coupling that prevents an enemy from easily forge the issuance or re-issuance of a new document, or forge the obsoleteness proof a previously issued document (that should be still in force), or forge a currentness proof of a previously issued document (that should be obsolete). A convenient way to achieve such secure de-coupling and address efficiency and interoperability problems consists of processing D, T, and AI (where D is the data-string proper component of the to be issued or re-issued document) as follows:

$$H(D), T, AI$$

where H is a one-way hash function, and for instance issue or re-issue the document by means of the following signature:

$$SIG_{DA}(H(D), T, AI).$$

This address the problems discussed above, because once H(D) has been computed (at issuance time), it may be stored, and then simply retrieved at each re-issuance. Thus, though D may be enormously long and H(D) non-trivial to compute, this computation needs not to be performed over and over again.

Note that a relying party that receives for the first time an issued or re-issued version of D may need to compute H(D) from scratch in order to verify the authenticity of the document (and its being in force), but having millions of different relying parties separately computing H(D) is very different than having the same DA compute H(D) over and over again.

Note also that the decoupling described herein is secure because an enemy may not fraudulently change the data authenticated by the DA's signature (e.g., any portion of H(D) or T, or AI) without being detected, because this entails forging the DA's signatures, which is computationally very hard to do. Thus, a possible hope that an adversary may have is finding false information that "fits" the data signed by the DA, that is, in the case of the system described herein, finding another data-string-proper D' such that H(D)=H(D'), but this is made computationally very hard by the very fact that H is one-way. Thus, the enemy is stuck with whatever the DA chooses to sign and may not alter it without being detected in any way.

Note that the above method is drastically different from the traditional hash-and-sign method. In such a method, rather than signing directly a message (i.e., string) M, one first computes H(M) and then the signature of H(M). Applying this traditional method to the system discussed herein would yield the following issuance/re-issuance signature $$SIG_{DA}(H(D, T, AI)),$$

because, in the system described herein, the message to authenticate is M=D,T,AI. But this would be no savings at all: in fact, T changes at each re-issuance, and thus the entire message D,T,AI needs to be one-way hashed from scratch. If, instead, the traditional hash-and-sign method were to be applied after secure decoupling has been implemented, then the resulting issuance/re-issuance signature, than $SIG_{DA}$(H (D), T, would be $$SIG_{DA}(H(H(D), T, AI)),.$$

Note that this DOES yields the desired savings, because H(D) is short (typically twenty or forty bytes) and thus processing H(D) is dramatically different than processing D at each re-issuance.

Note also that the secure de-coupling method may be implemented in several ways, all within the scope of the system described herein. In particular, AI (if it does not change at re-issuance time) may be brought into the same static part that D belongs to. That is, an issued/re-issued document may take the form $$SIG_{DA}(H(D,AI), T).$$

Also, data AI may be divided is two substring AI1 and AI2, and only one may be brought in the same static part as D:

$$SIG_{DA}(H(D,AI1), T, AI2).$$

Similarly, T may be broken into two components, one static, T1, and one dynamic, T2. For instance, the original life-span interval of D may be "Jan. 1, 2004-Jan. 2, 2004"; the life-span interval of its next re-issuance may be "from Jan. 1, 2004-Jan. 3, 2004"; and so forth. Thus, "Jan. 1, 2004" is a static component. Such static components may be brought in the static part together with D, yielding a issued/re-issued document of the form $$SIG_{DA}(H(D,T1), T2, AI).$$

Mixed strategies are also possible such as $$SIG_{DA}(H(D,AI1,T1), T2, AI2).$$

Finally, one may have only part of D, D1, in the static part and another part, D, outside of it: eg., $$SIG_{DA}(H(D1), D2, T, AI) \text{ or } SIG_{DA}(H(D1,T1,AI1), D2, T2, AI2).$$

Alternatively, it is possible to have two or more pieces of D into separate static parts (and other pieces of D possibly outside): eg., $$SIG_{DA}(H(D1), H(D2), T, AI) \text{ or } SIG_{DA}(H(D1,T1,AI1), H(D2), D3, T2, AI2)$$

The same symbol H in the same symbolic expression may stand in for different one-way hash functions, and the one-way functions used may be specified as fields (symbolically, made part of AI).

The CA may prove the currentness status of a plurality of documents by means of a single digital signature. For instance, at an update, assuming that the highest serial number of a non-expired document is n, the CA may prove which (non-expired) document are current and which are obsolete, by producing the digital signature $SIG_{CA}$(B, T, AI), where B is the n-bit string whose ith bit is 1 if the document having serial number i is deemed current in interval T, and 0 if the document having serial number i is deemed obsolete. Along the same vein, the CA may take an serial number interval of length L, for instance, all serial numbers between 10,000 and 11,000 (in which case L=1,000) and generate an L-bit string BL whose ith bit is 1 if the document having serial number i is deemed current in interval T, and 0 if the document having serial number i is deemed obsolete. After that, the CA produces the signature $SIG_{CA}$(SNI, BL, T, AI), where SNI is any way to indicate the interval in question, indicating the currentness status of all documents whose serial number is in the interval. For instance, SNI could be specified by its initial and end point (e.g., (10,000, 11,000)), or by its initial point only if all intervals have the same length).

Another batch processing is obtained by having currentness information about a plurality of documents in a given time interval T stored in the nodes of a generalized Merkle tree, and then having the CA digitally the root content of said tree, possibly specifying T and possibly additional information AI. By a generalized Merkle tree it is meant a directed acyclic graph having a node from which all other nodes may be reached, or an indirect graph, whose edges may be directed so as to obtain a generalized Merkle tree. In a generalized Merkle tree any value may be stored in a node with no outcoming edges (after directions are conceptually added, if they were not there to begin with), otherwise the content of a node N will depend, via a one-way hash function, on the content of the nodes reachable from N. For instance, without limitation intended, if a node N has two (conceptually) directed children A and B, having stored values A' and B' respectively, then the total value stored in of N could be H(A'B'). As for another example, if N has its own content N' stored in it and two directed children A and B storing values A' and B' respectively, the total value stored in N could be H(N'A'B'); or N'H(A'B'); or H(N'H(A'B')).

The above practical solution extends to physical documents as well. For instance, one may use the physical document's support (e.g., the document's sheet of paper) a unique data string DS (e.g., DS is the digitization of a microfiber of the paper). Alternatively, one may obtain DS by manipulating the document physical support (e.g., spray the support so as to obtain a unique scattering of the light). Alternatively yet, one may embed in a non tamperable way something in the document's physical support so as to obtain an easy to read data string DS unique to the document. This done, it is possible to treat such DS very much a we did treat an identifier of an electronic document. For instance, without intending to be exhaustive nor limiting, a CA may at each update produce a signature SIGCA(DS, current, T, AI) to indicate that document D having a physical identifier DS is to be deemed current for the time interval T.

Also, one could securely embed into a physical document D a unique public key PK in a non-tamperable way (or at least in a way that shows that the document has been tampered with whenever PK is successfully altered or removed). In this case, a CA may prove D current at a given update like for an electronic document. For instance, without limitation intended, the CA could produce a digital signature relative to PK, $SIG_{PK}$(current, T, AI) to signify that D is to be deemed current throughout the time interval T.

An embodiment of the DCS may be obtained by using within the general DCS a specific implementation of a technology of the U.S. Pat. No. 5,666,416 patent. This technology enables one to use one-way functions (and in particular one-way hash functions) to generate special public/secret key pairs (PK,SK) that enable one to digitally sign an encoding of "current in a given time interval Ti, e.g., Ti=(Di,Di+1)."

Identifying characteristics ("ID") of a specific version of an electronic document D are registered with a central software component ("Currentness Authority"). Two hash chains (sequences of short data values generated by repeated application of SHA-1 or similar one-way hashing algorithm ["HASH"]) are created by the Currentness Authority and associated with document D in a data repository. The first hash chain is one "step" long (one application of the hashing algorithm)' and consists of two values; this is the "revocation" hash chain (R) consisting of values $R_\alpha$ and $R_\Omega$, where $R\Omega = HASH(R_\alpha)$. The second hash chain is N steps long (N repeated applications of the hashing algorithm); this is the "currentness" hash chain (F) consisting of values $F_\alpha$, N−1 intermediate values, and $F_\Omega$. Each step in F represents a specific, predetermined time period (e.g. one day, one week, one month).

The values $R_\Omega$ and $R_\alpha$, along with the time at which they were generated, are embedded in document D, creating a currentness-enabled document $D_{FE}$. Document $D_{FE}$ is distributed to users by any appropriate means (e.g. download from an internet site, electronic mail, etc).

When the document D is revised, the new version of the document (D') is registered with the Currentness Authority as above (yielding currentness-enabled document $D'_{FE}$), and all previous versions of the document are marked as "obsolete" in the Currentness Authority's data repository.

A software component ("Currentness Agent") resides on computer systems that may make use of currentness-enabled documents. The Currentness Agent periodically retrieves currentness indicators from the Currentness Authority for each currentness-enabled document it is aware of, by passing each document's ID to the Currentness Authority; currentness indicators returned by the Currentness Authority are elements from the appropriate document's currentness chain corresponding to the current time in relation to the currentness chain's time period:

During the first time period after the currentness chain's creation time, a currentness indicator I is returned such that $HASH(I)=F_\Omega$;

During the second time period after the currentness chain's creation time, a currentness indicator I is returned such that $HASH(HASH(I))=F_\Omega$;

etc

Alternatively, the Currentness Authority may return the document's $R_\alpha$ value (such that $HASH(R_\alpha)=R_\Omega$), indicating that the document in question no longer is the most recent revision.

When currentness-enabled document $D_{FE}$ is accessed, the Currentness Agent intervenes and determines whether the document is "current" or "obsolete" (i.e. is or is not the most current revision). The Currentness Agent does so by obtaining the current currentness indicator I for the document (either directly from the Currentness Authority at the moment the document is accessed, or from data previously retrieved from the Currentness Authority as above), and comparing I to the values $R_\Omega$ and $F_\Omega$ embedded in the document. If HASH(I) is equal to $R_\Omega$, the document is known to be "obsolete" (i.e. not the most current revision), and the user is informed of the newer revision and/or the newer revision of the document is retrieved on behalf of the user. Otherwise, the value I is hashed a number of times corresponding to the current time in relation to the currentness chain's time period:

During the first time period after the currentness chain's creation time, if $HASH(I)=F\Omega$, the document is known to be "current" (i.e. the most current revision);

During the second time period after the currentness chain's creation time, if $HASH(HASH(I))=F\Omega$, the document is known to be "current";

etc

If I examined in this way matches neither $R_\Omega$ nor $F_\Omega$, then the user (along with, possibly, other interested parties) is informed that their computer system's clock may be set incorrectly, or that the document may have become corrupted or been tampered with.

The use of a one-way hashing algorithm (such as SHA-1) in creating and testing currentness indicators allows for irrefutable proof that a particular document is known to be or not be the most current revision, and does so in an efficient manner (in terms of both computer processing and network transmission costs). The periodic retrieval of currentness indicators by the Currentness Agent allows for trusted determination of a document's currency even when the user's computer system has only intermittent access to the network.

An organization/DA/CA/responder/party/user may be any entity (e.g., person, organization, server, device, computer program, computer file) or a collection of entities.

Sending a piece of data D (to party X) should be construed to include making D available (or causing X to receive D).

"Valid" may be used as a synonym of "current" and "revoked" as a synonym of "obsolete".

Documents should be construed to include all kinds of signed data, and in particular hierarchical documents, that is, documents whose currentness may depend on that of other documents. Therefore, the techniques of U.S. Pat. No. 5,420,927 herein incorporated by reference, apply so as to enable the transformation of hierarchical documents into flat documents. Currentness status and proofs of currentness status may include validity status and proofs of validity status for hierarchical certificates (e.g., validity status and proofs of validity status of all certificates in a chain of certificates).

Indeed verifying the currentness of a document D may include. verifying the validity of the certificate for the DA that issued D, as well as the validity of the certificate for the CA providing a signed response about the currentness status of D.

While the invention has been disclosed in connection with various embodiments, modifications thereon will be readily apparent to those skilled in the art. Accordingly, the spirit and scope of the invention is set forth in the following claims.

What is claimed is:

1. A method of conveying currentness information about a document that is one of a plurality of documents, comprising:
    at every date j of a sequence of dates, and for every document i of the plurality of documents, having a currentness authority, that includes at least one processor, compute individual currentness status information Ci about i by digitally signing information identifying i, date j and an indication whether i continues to be valid, or is obsolete, or is suspended, wherein the currentness authority computes the individual currentness status information Ci independently of a request for the document i;
    providing the digitally signed currentness status information Ci to a responder that includes at least one processor;
    for each document i in a plurality of documents, having the responder store the latest received Ci; and
    in response to an inquiry about currentness status of document i, having the responder provide the latest received Ci.

2. A method, according to claim 1, wherein digitally signing includes digitally signing with respect to a public verification key pk, which is digitally signed by the document authority with respect to another public verification key PK.

3. A method, according to claim 2, wherein the public verification key pk, is contained as part of the document i.

4. A method, according to claim 3, wherein the currentness authority produces the public key pk and makes it available to the document authority, while retaining the corresponding secret key sk.

5. A method, according to claim 1, wherein the currentness status information Ci of an obsolete document i includes a signature indicating that i has been revoked together with i's revocation date.

6. A method, according to claim 1, wherein the currentness status information Ci of an obsolete document i includes a signature indicating a more current version of the document.

7. A method, according to claim 1, wherein the responder is not trusted and can not make an obsolete or suspend document current and cannot make a current document obsolete or suspended.

8. A method, according to claim 1, wherein information identifying i is i itself.

9. A method, according to claim 1, wherein information identifying i is a compact representation of i.

10. A method, according to claim 9, wherein the compact representation is computed via a hash function.

11. A method, according to claim 1, wherein information identifying i is a serial number.

12. A method, according to claim 1, wherein the currentness authority receives updates of document currentness from the document authority and uses them in order to compute the currentness status of documents.

13. A method, according to claim 12, wherein the currentness authority computes the status of each document as valid until the updates inform otherwise.

14. A method, according to claim 12, wherein the currentness authority computes the status of each document as valid until a prespecified date and time.

15. A method, according to claim 1, wherein each date in the sequence of dates is determined by the document authority.

16. A method, according to claim 1, wherein the document i contains information on the currentness authority responsible for updating the currentness status.

17. A method, according to claim 1, wherein the currentness authority is the same entity as document authority.

18. A method of conveying currentness information about a document that is one of a plurality of documents, comprising:
    at every date j of a sequence of dates, and for every document i of the plurality of documents, computing individual currentness status information Ci about i by digitally signing information identifying i, date j and an indication whether i continues to be valid, or is obsolete, or is suspended, wherein a currentness authority, that includes at least one processor, computes the individual currentness status information Ci independently of a request for the document i;
    for each document i in a plurality of documents, storing the latest Ci in a responder that includes at least one processor; and
    in response to an inquiry about currentness status of document i, retrieving the latest received Ci from the responder and providing the latest received Ci.

19. A method of verifying whether a particular document that is one of a plurality of documents is currently valid at a current date, comprising:
    receiving particular currentness status information about the particular document, wherein currentness status information Ci, for every document i is determined by having a currentness authority, that includes at least one processor, compute individual Ci about document i by digitally signing information identifying i, date j for every date j of a sequence of dates, and an indication whether i continues to be valid, or is obsolete, or is suspended, wherein the currentness authority computes the individual currentness status information Ci independently of a request for the document i;
    confirming that the particular currentness status information was digitally signed by the currentness authority and that the particular currentness status information indicates that the particular document continues to be valid at the current date; and
    storing the particular currentness status information in a responder that includes at least one processor.

* * * * *